United States Patent Office 3,576,828
Patented Apr. 27, 1971

3,576,828
$\Delta^{4,9,11}$-TRIENES OF THE 19-NOR-ANDROSTENE SERIES AND PROCESS FOR THEIR MANUFACTURE
Georg Anner, Basel, and Peter Wieland, Oberwil, Basel-Land, Switzerland, assignors to Ciba Corporation, New York, N.Y.
No Drawing. Filed July 22, 1966, Ser. No. 567,377
Claims priority, application Switzerland, July 30, 1965, 10,790/65; Sept. 10, 1965, 12,624/65
Int. Cl. C07c *169/20*
U.S. Cl. 260—397.3
21 Claims

ABSTRACT OF THE DISCLOSURE

Process for the manufacture of $\Delta^{4,9,11}$-trienes of the 19-nor-androstane series, in which 17-oxygenated 3-oxo-$\Delta^{5(10)9(11)}$-19-nor-androstadienes are treated with one mol equivalent of a peracid, the monoepoxides so obtained or mixtures thereof are treated with a Lewis acid, if desired, after treatment with an adsorbent containing silica or alumina. If desired, functionally modified hydroxyl groups or oxo groups that are present are converted into free hydroxyl or oxo groups or free hydroxyl groups are functionally modified, or dehydrogenated to an oxo group and/or a 17-oxo group is reduced, if desired, with simultaneous introduction of a hydrocarbon radical in 17α-position. The compounds of the invention display exceptionally high androgenic and anabolic or gestagenic activity.

The present invention provides a process for the manufacture of $\Delta^{4,9,11}$-trienes of the 19-nor-androstane series, especially 17-oxygenated 3-oxo-$\Delta^{4,9,11}$-19-nor-androstatrienes, that is to say, those having a free or functionally modified oxo group or a free or functionally modified hydroxyl group in 17-position. The products obtainable by the process, most of which are already known, display exceptionally high androgenic and anabolic or gestagenic activity and are thus of considerable importance pharmacologically. Special mention must be made of 3-oxo-17β-hydroxy-$\Delta^{4,9,11}$-19-nor-androsta triene, its 17-esters and the 17α-methyl derivatives thereof, which are among the most potent of the androgenically active compounds known hitherto. Till now, these compounds have been obtainable only by total synthesis. By means of the process of the present invention it is now possible to produce this class of compound by partial synthesis.

In the new process, 17-oxygenated 3-oxo-$\Delta^{5(10):9(11)}$-19-nor-androstadienes are treated with one mol equivalent of a peracid, the monoepoxides so obtained or mixtures thereof are treated with a Lewis acid, if desired, after treatment with an adsorbent containing silica or alumina. If desired, functionally modified hydroxyl groups or oxo groups that are present are converted into free hydroxyl or oxo groups or free hydroxy groups are functionally modified, or dehydrogenated to an oxo group and/or a 17-oxo group is reduced, if desired, with simultaneous introduction of a hydrocarbon radical in 17α-position.

The oxygenated group present in the starting materials at 17-position is a free or functionally modified hydroxyl or oxo group; by functionally modified hydroxyl group is meant, in particular, an esterified or etherified hydroxyl group and, by functionally modified oxo group is meant, in particular, a ketalized oxo group. The esterified hydroxyl groups primarily considered are those that are derived from organic carboxylic acids of the aliphatic, alicyclic, aromatic or heterocyclic series, especially those having 1 to 15 carbon atoms, for example, those derived from formic acid, acetic acid, propionic acid, butyric acids, valeric acids, for example, n-valeric acid, trimethyl acetic acid, caproic acids, for example, β-trimethyl-propionic acid or diethyl-acetic acid, oenanthic, caprylic, pelargonic, capric and undecanoic acids, for example, undecylenic acid, lauric, myristic, palmitic or stearic acids, for example, oleic acid, cyclopropane carboxylic acid, cyclobutane carboxylic acid, cyclopentane carboxylic acid and cyclohexane carboxylic acid, cyclopropylmethane carboxylic acid, cyclobutylmethane carboxylic acid, cyclopentylethane carboxylic acid, cyclohexylethane carboxylic acid, cyclopentyl-, cyclohexyl- or phenylacetic or propionic acids, benzoic acid, phenoxyalkanoic acids, for example, phenoxyacetic acid, para-chloro-phenoxyacetic acid, 2,4-dichloro-phenoxyacetic acid, 4-tertiary-butylphenoxyacetic acid, 3-phenoxypropionic acid, 4-phenoxybutyric acid, furan-2-carboxylic acid, 5-tertiary-butyl-furan-2-carboxylic acid, 5-bromo-furan-2-carboxylic acid, nicotinic or isonicotinic acid.

There also come into consideration lower aliphatic and monocyclic aromatic sulfonic acids, such as methane-, ethane-, benzene or p-toluene sulfonic acid and moreover inorganic acids, for instance sulfuric acid, hydrohalic acids and especially also phosphoric acids, e.g. ortho- or meta-phosphoric acid.

Ether groups of which particular mention should be made are those derived from lower aliphatic alkanols, for example, ethyl alcohol, methyl alcohol, propyl alcohol, isopropyl alcohol, butyl or amyl alcohols, from araliphatic alcohols, especially monocyclic aryl lower aliphatic alcohols, for example, benzyl alcohol, or from heterocyclic alcohols, especially tetrahydropyranol. Of the ketalized oxo groups, special mention should be made of the lower alkylenedioxy groups. There also come into consideration enolether groups.

The starting materials may also contain other substituents, for example, functionally modified hydroxyl or oxo groups, alkyl groups, especially methyl groups, or halogen atoms, for example, in positions 1, 2, 4, 6, 7, 14, 15, 16 and 17. In particular, a methyl group may be present in 7α- or 7β-position and/or 16α- or 16β- position. Compounds containing a free or functionally modified hydroxyl group in 17β-position may also contain, in 17α-position, an aliphatic, saturated or unsaturated, substituted or unsubstituted hydrocarbon radical, especially a saturated or unsaturated lower aliphatic hydrocarbon radical having 1 to 4 carbon atoms, for example, an alkyl, alkenyl or alkinyl radical, for example, a methyl group, an ethyl group, a propyl group, a vinyl group, an allyl group, a methallyl group, an ethinyl group, a propinyl group, a trifluoropropinyl group or a trichloropropinyl group.

Conversion of the starting materials into a monoepoxide in accordance with the process of the invention is carried out in known manner. Organic per-acids are used, for example, perbenzoic acid, perphthalic acid or meta-chloro-perbenzoic acid, preferably in ether or a halogenated hydrocarbon, for example, chloroform or methylene chloride. One mol equivalent of peracid is used, an oxidation product being obtained in which different isomeric monoepoxides are present. For further processing, the single compounds can be separated from the mixture and purified, or mixtures of compounds can be used which, like the single compounds, can be obtained from the crude oxidation product, for example, by crystallization or other physical methods of concentration. The monoepoxides so isolated, for example, crystallized unitary or mixed monoepoxides, may either be converted directly into the end products by means of a Lewis acid or they may be converted first into isomeric modified products by a treatment with a suitable adsorbent, and the said modified products subsequently converted into the end products by means of Lewis acids. Very probably the said isomers are the 3-oxo-10-hydroxy-$\Delta^{4,9(11)}$- or 3-oxo-11α-hydroxy-$\Delta^{4,9(10)}$ - 19-nor-androstadienes corresponding to the end-products expected. These isomers can be obtained in the crystalline state by the said treatment with a suitable adsorbent and yield the desired end-products when treated with a Lewis acid.

Substances used to isomerize the monoepoxides are silica and alumina or adsorbents containing these substances, for example, fuller's earth, for example, that obtainable under the trade name "Florisil," alumina for chromatographic purposes, for example, having the activity levels I, II or III (Brockmann). The treatment is carried out in the solvents normally used for chromatography with these substances, using the usual eluting agents, for example, aliphatic or aromatic hydrocarbons, esters, for example, ethyl acetate, or mixtures thereof.

The end-products are obtained in a good yield from the above mentioned intermediates or directly from the above mentioned monoepoxides by a treatment with Lewis acids.

The Lewis acid used is, for example, boron trifluoride, preferably in the form of the ether complex, or zinc chloride, aluminium chloride, iron (III) chloride, iron (III) sulphate or tin (IV) chloride. The treatment with these reagents is carried out in an organic solvent, for example, an ether, for example, ethyl ether, or an aliphatic, cycloaliphatic or aromatic unsubstituted or halogenated hydrocarbon, for example, benzene, hexane, cyclohexane, chlorobenzene, methylene chloride, toluene or xylene.

If desired, free hydroxyl groups in the products obtained by a treatment with a Lewis acid may be functionally modified, that is to say, esterified or etherified or functionally modified hydroxyl groups may be hydrolysed. These reactions are carried out in known manner. For example, the esterification of hydroxyl groups can be effected with the halides or anhydrides of organic carboxylic or sulfonic acids, for example, those mentioned above, the treatment preferably being carried out in the presence of a tertiary organic base, for example, pyridine. Etherification is effected by a treatment with the halides or sulphates of the alcohols indicated in the presence of a base, for example, an organic nitrogen base or an alkali. Hydrolysis of esterified hydroxyl groups can be brought about by a treatment with an alkaline agent, for example, a dilute alkali hydroxide or alkaline earth hydroxide.

If desired, an oxo group in 17-position in the end-products obtained can be reduced to a hydroxyl group, if desired, with simultaneous introduct of a hydrocarbon radical in 17α-position. Reduction is advantageously effected by means of complex light metal hydrides, for example, sodium borohydride or lithium-aluminium hydride, in an ether, for example, tetrahydrofuran, or by means of a Grignard compound, for example, methylmagnesium bromide, in an ether, or by means of an alkali metal compound of an unsaturated aliphatic hydrocarbon, for example, sodium acetylide. In the last-mentioned cases, the appropriate hydrocarbon radical is introduced in 17α-position. When reducing the 17-oxo group, the 3-oxo group must first be shielded, which can be done, for example, by conversion into the oximes.

A free hydroxyl group present or formed in 17-position can be dehydrogenated to an oxo group in a manner known per se, for example according to the Oppenauer method.

The present invention also includes the new $\Delta^{4,9,11}$-17-oxygenated 3-oxo-7α-methyl-19-nor-androstatrienes, especially the corresponding 7α-methyl-compounds, especially those of the formula

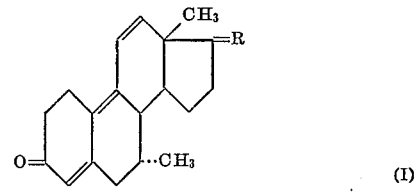

in which R is an oxo group, a free, an esterified or an etherified hydroxy group in β-position together with a hydrogen atom or with a saturated or unsaturated, substituted or unsubstituted lower aliphatic hydrocarbon radical. The esterified and etherified hydroxy groups and the hydrocarbon residue are preferably those mentioned above.

These new compounds display valuable pharmacological properties and/or they are intermediates for the preparation of substances with such properties. Thus they show for instance a strong androgenic and anabolic, antigonadotropic and gestagenic action. The gestagenic and antigonadotropic actions are especially pronounced in compounds of the above formula, in which R represents a hydroxy group in β-position together with an unsaturated aliphatic hydrocarbon radical, such as an unsubstituted or substituted ethinyl or propinyl group. There should especially be mentioned the $\Delta^{4,9,11}$-3-oxo-7α-methyl-17β-hydroxy-19-nor-androstatriene and its esters, especially those derived from lower aliphatic carboxylic acids, such as acetates, trimethylacetates, propionates, valerates, butyrates, but also from araliphatic acids such as phenyl propionic acid or from some higher aliphatic acids, such as capric acid, undecanoic acid, lauric acid, undecylenic acid, the $\Delta^{4,9,11}$-3-oxo-7α,17α-dimethyl-17β-hydroxy-19-nor-androstatriene, the $\Delta^{4,9,11}$-3-oxo-7α-methyl-17α-ethinyl-17β-hydroxy - 19 - nor-androstatriene and their esters, for instance such mentioned above.

The above $\Delta^{4,9,11}$-3-oxo-7α,17α-dimethyl-17β-hydroxy-19 - nor - androstatriene for instance possesses extremely high anabolic properties. It stimulates growth of the Levator ani muscle in castrated adult male rats in doses as low as 0.004 mg./kg. administered subcutaneously daily for two weeks. Under the same conditions, growth of the seminal vesicles, taken as a parameter for the androgenic effects, is stimulated by doses of 0.06 mg./kg. The $\Delta^{4,9,11}$-3 - oxo-7α-methyl-17α-ethinyl-17β-hydroxy-19-nor-androstatriene possesses high anti-ovulatory properties. Administered daily per os for four days to normal female rats, treatment beginning on the day of diestrus, this compound at a dose of 0.1 mg./kg., completely inhibits the spontaneous ovulation. The compound also possesses marked progestational properties. Administered orally to estrogen-sensitized castrate female rabbits, at a dose of 0.2 mg./kg. of 5 days, it induces complete secretory transformation of the endometrium which is taken as a parameter of its progesterone-like activity.

The $\Delta^{4,9,11}$-3,17 - dioxo-7α-methyl-19-nor-androstatriene is an important intermediate for the manufacture of the above named $\Delta^{4,9,11}$-3-oxo-7α-methyl-17β-hydroxy-19-nor-androstatriene and its derivatives with a hydrocarbon radical in 17α-position. The conversion of the 17-oxo group into the substituents of these compounds is carried out as described above.

Most of the starting materials are known. New starting materials may be prepared by known methods. For example, starting materials which are substituted in 7α-position by a methyl group e.g. those corresponding to the final compounds especially set forth above may be prepared, for example, form 7α-methyloestratrienes, according to the following reaction pattern:

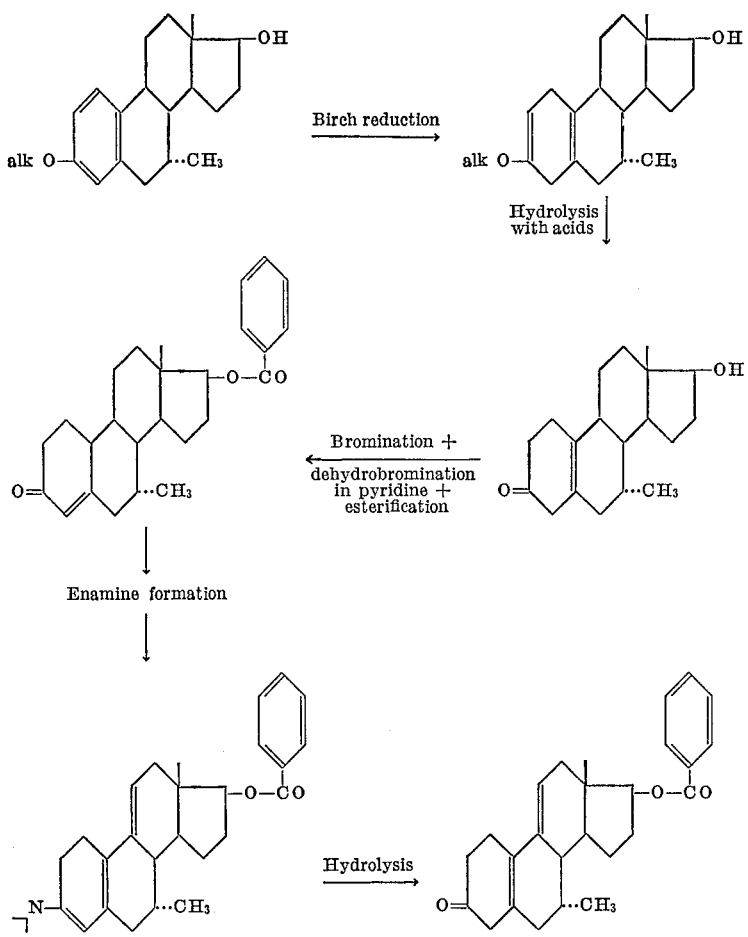

The present invention also relates to the manufacture of pharmaceutical preparations for use in human or veterinary medicine which contain the substances described above, such as the 17-oxygenated 3-oxo-7-methyl-$\Delta^{4,9,11}$-19-nor-androstatrienes, especially the 3-oxo-7α-methyl-$\Delta^{4,9(11)}$-19-nor-androstatrienes as active principles. The excipients used are organic or inorganic excipients suitable for enteral, for example, oral, parenteral or local administration. Suitable excipients are substances that do not react with the new compounds, for example, water, gelatine, lactose, starch, magnesium, stearate, talcum, vegetable oils, benzyl alcohols, gums, polyalkylene glycols, white petroleum jelly, cholesterol and other known medicinal excipients. The pharmaceutical preparations may be, for example, tablets, dragées or capsules, or in liquid form as solutions, suspensions or emulsions, or they may be in the form of ointments or creams. The preparations may be sterilized and/or contain assistants such as preserving, stabilizing, wetting or emulsifying agents, salts for regulating the osmotic pressure or buffers. They may further contain other therapeutically valuable substances. The new compounds can also be used as starting materials in the manufacture of other valuable compounds.

The following examples illustrate the invention.

EXAMPLE 1

3.36 grams of meta-chloro-perbenzoic acid of 85% strength are added to a solution of 6 grams of 3-oxo-17β-benzoyloxy-$\Delta^{5(10):9(11)}$-19-nor-androstadiene in 120 ml. of methylene chloride while stirring and cooling with a mixture of ice and methanol. After stirring for 30 minutes the batch is allowed to stand for 6 hours at −8° C. and is then poured into 300 ml. of a 2 N sodium carbonate solution. The batch is extracted three times with toluene and the organic solutions are washed four times with 300 ml. of a 2 N sodium carbonate solution each time, and three times with water. The organic solutions are dried, evaporated in vacuo and the residue is recrystallized from a mixture of methylene chloride, ether and petroleum ether, 5.4 grams of a crystalline mixture of the monoepoxides of the starting material being obtained. The melting point is at about 151 to 157° C.

The mother liquor is chromatographed on 30 grams of Florisil and the crystalline fractions eluted with a 19:1 mixture of toluene and ethyl acetate are recrystallized from a mixture of methylene chloride, ether and pentane. 270 milligrams of an inhomogeneous crystalline product, designated A herein, are obtained which displays a hydroxyl band in the infra-red spectrum and which absorbs at about 230 mµ in ultra-violet. 0.48 millilitre of boron trifluoride etherate is added to a solution of the crystalline product so obtained in 2.4 ml. of methylene chloride and 9.6 ml. of absolute ether while stirring. 20 minutes later the batch is poured on to a sodium bicarbonate solution, the batch is extracted with methylene chloride and then washing is carried out with water. The organic solution is dried, evaporated in vacuo and the residue is chromatographed on 15 grams of silica gel (Merck). The fractions eluted with a 19:1 mixture of toluene and ethyl acetate are crystallized from a mixture of methylene chloride, ether and pentane. 145 milligrams of 3-oxo-17β-benzoyloxy-$\Delta^{4,9,11}$-19-nor-androstatriene melting at 149.5 to 151° C. are obtained. In an alcohol solution the triene adsorbs at 231 mµ (ε=21000) and 340 mµ (ε=30600).

EXAMPLE 2

800 milligrams of the crystalline mixture of monoepoxides of 3-oxo-17β-benzoyloxy - $\Delta^{5(10):9(11)}$ - 19-nor-androstadiene described in Example 1 are chromatographed on 24 grams of neutral alumina (activity level II). The fractions eluted with a 19:1 mixture of toluene and ethyl acetate are crystallized from a mixture of ether/pentane and 78 mg. of the inhomogeneous crystalline product A described in Example 1 are obtained. The latter fractions eluted with a 9:1 mixture of toluene and ethyl acetate are crystallized from a mixture of methylene chloride and ether. 190 milligrams of 3-oxo-11α-hydroxy-17β-benzoyloxy - $\Delta^{4,9}$ - 19-nor-androstadiene melting at 181 to 182° C. are obtained. Infra-red spectrum (solvent: methylene chloride): 2.75μ (hydroxyl); 5.83μ (benzoate); 6.02μ+6.23μ+6.30μ (dienone).

0.01 millilitre of boron trifluoride etherate is added to a solution of 10 mg. of this hydroxyidenone in 0.1 ml. of methylene chloride and 0.4 ml. of ether, and the batch is allowed to stand for 20 minutes at room temperature. After working up in the manner described in Example 1 and crystallization from ether, 3-oxo-17β-benzoyloxy-$\Delta^{4,9,11}$-19-nor-androstatriene is obtained which shows no drop in the melting point as compared with the compound obtained in the manner described in Example 1.

EXAMPLE 3

4 grams of the crystalline mixture of monoepoxides of 3-oxo-17β-benzoyloxy - $\Delta^{5(10):9(11)}$ - 19-nor-androstadiene described in Example 1 are dissolved in 40 ml. of methylene chloride and 160 ml. of absolute ether, and then 8 ml. of boron trifluoride ethereate are added while stirring. After 20 minutes the batch is poured on to 250 ml. of saturated sodium bicarbonate solution and extraction is carried out three times with methylene chloride. The organic solutions are washed with water, dried and evaporated in vacuo and the residue is chromatographed on 200 grams of silica gel (Merck). The fractions eluted with a 49:1 mixture of toluene and ethyl acetate are crystallized from a mixture of ether and pentane. 790 milligrams of 9,11-dehydro-oestrone-17-benzoate melting at 106 to 108° C. are obtained. In ultraviolet, a solution of the compound in alcohol shows maxima at 220 mμ (ε=24000); 262 mμ (ε=18600) and 300 mμ (ε=2800). The fractions eluted with a 19:1 mixture of toluene and ethyl acetate contain 3-oxo-17β-benzoyloxy - $\Delta^{4,9,11}$ - 19-nor-androstatriene; crystallization yields 660 mg. of this compound melting at 149 to 150.5° C.

EXAMPLE 4

4 grams of 3-oxo-17β-benzoyloxy-$\Delta^{5(10):9(11)}$-19-nor-androstadiene are melted in 80 ml. of methylene chloride and epoxidized with 2.24 grams of meta-chloroperbenzoic acid by allowing the batch to stand overnight at about −8° C. 3.84 grams of crystallized monoepoxide mixture are obtained by working up in the manner described in Example 1. 1 gram of the said mixture dissolved in toluene is absorbed on 30 grams of neutral alumina (activity level II). Elution is effected with 100 ml. each of toluene and a mixture of toluene and ethyl acetate (49:1). After 1 hour the column is washed out with 1.8 litres of a 9:1 mixture of toluene and ethyl acetate and the filtrate is evaporated in vacuo. The residue (960 mg.) is dissolved in 10 ml. of methylene chloride and 40 ml. of ether, and then 2 ml. of boron trifluoride etherate are added while stirring. After 15 minutes 80 ml. of saturated sodium bicarbonate solution are added and the batch is extracted three times with methylene chloride. The organic solutions are washed with water, dried and evaporated in vacuo and the residue is chromatographed on 50 grams of silica gel (Merck). The fractions eluted with a 19:1 mixture of toluene and ethyl acetate are crystallized from a mixture of methylene chloride, ether and pentane. 470 milligrams of 3-oxo-17β-benzoyloxy - $\Delta^{4,9,11}$ - 19-nor-androstatriene melting at 150 to 151° C. are obtained.

The mother liquor of the crystallized monoepoxide mixture obtained as described above is evaporated and the residue (550 mg.) is adsorbed on alumina in the same manner and subsequently treated with boron trifluoride etherate. After chromatography on silica gel, 130 mg. of 3-oxo-17β-benzoyloxy-$\Delta^{4,9,11}$-19-nor-androstatriene melting at 150 to 151° C. are obtained.

The total yield is thus 50% of the weight of the starting material used. The same result is obtained when the crude monoepoxide mixture is isolated from the peracid/oxidation solution and, without crystallization, is directly chromatographed in the manner described and then reacted with boron trifluoride etherate.

EXAMPLE 5

The crude monoepoxidation mixture obtained from 3-oxo-7α-methyl-17β-benzoyloxy-$\Delta^{5(10):9(11)}$-19-nor - androstadiene is first adsorbed on alumina as in Example 4 and then treated with boron trifluoride etherate. 3-oxo-7α-methyl-17β-benzoyloxy-$\Delta^{4,9,11}$-19-norandrostatriene is obtained after chromatography on silica gel.

The 3-oxo-7α-methyl - 17β - benzoyloxy-$\Delta^{5(10):9(11)}$-19-nor-androstadiene used as starting material is prepared as follows:

2 grams of lithium-aluminium hydride are added to a solution of 18.75 grams of the methyl ether of 7α-methyloestrone in 180 ml. of tetrahydrofuran at −16° C. while stirring and in a current of nitrogen. 45 minutes later a mixture of 20 ml. of ethyl acetate and 20 ml. of toluene is added, followed by 400 ml. of semi-saturated Seignette salt solution. Extraction is then carried out three times with toluene and the organic solutions are washed several times with semi-saturated Seignette salt solution. The organic solutions are dried and evaporated in vacuo and the residue is crystallized from a mixture of methylene chloride, ether and methanol. The crystalline product is dried at 75° C. in a high vacuum. 17.4 grams of 3-methoxy-7α-methyl-17β-hydroxy-$\Delta^{1,3,5(10)}$-oestratriene are obtained. After recrystallization the product melts at 129 to 131° C. A further 680 mg. of the same compound can be obtained from the mother liquor.

A solution of 17.4 grams of 3-methoxy-7α-methyl-17β-hydroxy-$\Delta^{1,3,5(10)}$-oestratriene in 210 ml. of tetrahydrofuran and 210 ml. of tertiary-butanol is added to 540 ml. of liquid ammonia while stirring and rinsing with a mixture of 30 ml. of tetrahydrofuran and 30 ml. of tertiary butanol. 30 grams of sodium in the form of small lumps are then added at an internal temperature of −70 to −60° C. After stirring for 4¾ hours at the given temperature, 200 ml. of methanol are cautiously added, during which process the temperature rises to −40° C. ¾ hour later, the cooling means is removed and the temperature rises to −29° C. As soon as all the ammonia has evaporated and sodium is no longer present, 450 ml. of water are cautiously added, followed by 450 ml. of saturated sodium chloride solution. After extracting three times with toluene, the organic solutions are washed with semi-saturated toluene, the organic solutions are washed with semi-saturated sodium chloride solution, dried, and evaporated in vacuo. The residue is crystallized from a mixture of ether and pentane. 16.2 grams of 3-methoxy-7α-methyl-17β-hydroxy-$\Delta^{2,5(10)}$-19-nor-androstadiene melting at 115 to 116° C. are obtained. A further 0.8 gram of the same compound is obtainable from the mother liquor.

A solution of 13.8 grams of oxalic acid dihydrate in 180 ml. of water is added to a solution of 15 grams of 3-methoxy-7α-methyl-17β - hydroxy - $\Delta^{2,5(10)}$-19-nor-androstadiene in 900 ml. of methanol. After 40 minutes the batch is discharged onto water and extracted three times with toluene. The organic solutions are washed successively with sodium bicarbonate solution and water, dried, and evaporated in vacuo. The residue consists of 3-oxo-7α-methyl - 17β - hydroxy - $\Delta^{5(10)}$ - 19 - nor-androstene, which melts at 130 to 131.5° C. after recrystallization from a mixture of methylene chloride, ether and pentane. The product so obtained is brominated in known manner in a pyridine solution, in which process 3-oxo-7α-methyl-17β-hydroxy-$\Delta^{4,9}$-19-nor-androstadiene melting at 166 to 169° C. is obtained. It is benzoylated with benzoyl chloride in a pyridine solution and the 17-benzoate melting at 183 to 185° C. so obtained is converted in known manner via the enamine into 3-oxo-7α-methyl-17β-benzoyloxy-$\Delta^{5(10):9(11)}$-19-nor-androstadiene.

EXAMPLE 6

3.4 grams of 3-methoxy-7α-methyl-17-oxo-$\Delta^{2:5(10)}$-19-nor-androstadiene are added to 35 ml. of a 3 N solution of methylmagnesium chloride in ether while stirring and in a current of nitrogen; this is followed by rinsing with 35 ml. of ether. The batch is stirred overnight at room temperature, ammonium chloride solution is added with cooling, and extraction is effected with methylene chloride. The organic solution is washed, dried and evaporated in vacuo, and the residue is chromatographed on 100 grams of alumina (activity level II). The first fractions eluted with a 1:1 mixture of toluene and petroleum ether are crystallized from a mixture of ether and pentane, 410 mg. of starting material being obtained. The subsequent fractions contain 3-methoxy - 7α,17α - dimethyl - 17β - hydroxy-$\Delta^{2:5(10)}$-19-nor-androstadiene which melts at 107 to 108° C. after crystallization from a mixture of ether and pentane. The crude carbinol is dissolved in 260 ml. of methanol, a solution of 4 grams of oxalic acid dihydrate in 52 ml. of water is added and the batch is allowed to stand for 40 minutes at room temperature. It is diluted with water, extracted with toluene, the organic solutions are washed with dilute sodium bicarbonate solution and water, dried, and evaporated in vacuo. The residue is crystallized from a mixture of methylene chloride and ether. 2.36 grams of 3-oxo-7α,17α-dimethyl-17β-hydroxy-$\Delta^{5(10)}$-19-nor-androstene are obtained which melts at 136.5 to 138° C. after recrystallization.

The 3-methoxy-7α-methyl - 17 - oxo-$\Delta^{2:5:(10)}$-19-nor-androstadiene used as starting material is prepared as follows: A solution of 16.2 grams of 3-methoxy-7α-methyl-17β-hydroxy-$\Delta^{2:5(10)}$-19-nor-androstadiene and 14.4 grams of aluminium-isopropylate in 480 ml. of toluene and 120 ml. of cyclohexane is boiled for 1¾ hours in a current of nitrogen while stirring. After cooling the reaction solution it is poured on to a dilute Seignette salt solution and extracted several times with toluene. The organic solutions are washed with dilute Seignette salt solution, dried, and evaporated in vacuo, and the residue is freed from high boiling ingredients by a treatment for one hour at 80° C. in a rotary evaporator under a pressure of 0.05 mm. Hg. It is absorbed in toluene and the solution is filtered through 72 grams of alumina (activity level II) while washing with 3 litres of toluene. The filtrate is evaporated in vacuo and crystallized from a mixture of ether and pentane. 12.76 grams of 3-methoxy-7α-methyl-17-oxo-$\Delta^{2:5(10)}$-19-nor-androstadiene melting at 124.5 to 126.5° C. are obtained.

EXAMPLE 7

14.8 millilitres of a 1.11 N solution of bromine in carbon tetrachloride are added to a solution of 2.42 grams of 3 - oxo-7α,17α-dimethyl-17β-hydroxy-$\Delta^{5(10)}$-19-nor-androstene in 70 ml. of pyridine in the course of 15 minutes while stirring and cooling with ice; rinsing is then effected with 5 ml. of pyridine. The batch is allowed to stand for 4 hours at room temperature, whereupon it is poured on to 200 ml. of semi-saturated sodium bicarbonate solution and extracted three times with methylene chloride. The organic solutions are washed with dilute sodium thiosulphate solution and water, dried, and then evaporated in vacuo at 30° C., and the residue is chromatographed on 120 grams of siilca gel. The fractions eluted with a 19:1 mixture of toluene and ethyl acetate are crystallized from a mixture of methylene chloride/ether and 415 mg. of starting material are recovered. 3-oxo-7α,17α-dimethyl-17β-hydroxy-$\Delta^{4:9}$-nor-androstadiene is eluted with a 9:1 mixture of toluene and ethyl acetate and is crystallized from a mixture of methylene chloride, ether and petroleum ether; (yield 1.16 grams). The crystals obtained melt at 174.5 to 176.5° C. after a second recrystallization. The ultraviolet spectrum of the compound dissolved in fine spirit shows a maximum at 308 m$\mu$ ($\epsilon$=20000).

EXAMPLE 8

A mixture comprising 120 mg. of 3-oxo-7α,17α-dimethyl-17β-hydroxy-$\Delta^{4:9}$-19-nor-androstadiene, 1 ml. of methanol and 0.1 ml. of pyrrolidine is boiled for 5 minutes in a current of nitrogen. After cooling to −10° C., crystallization occurs and the crystals are isolated by filtration and washed with ice-cold methanol. 80 milligrams of 3-pyrrolidino - 7α,17α - dimethyl-17β-hydroxy-$\Delta^{3:5(10):9(11)}$-19-nor-androstatriene are obtained in the form of yellow needles. The ultra-violet spectrum of the compound dissolved in ether shows a maximum at 349 m$\mu$.

76.2 milligrams of enamine so obtained are triturated for one minute with 0.1 ml. of glacial acetic acid; 1 ml. of water is added and extraction with methylene chloride is carried out several times 15 minutes later. The methylene chloride solutions are washed with sodium bicarbonate solution and water, dried, and evaporated in vacuo. The residue is dissolved in 2 ml. of methylene chloride and then 44 mg. of meta-chloro-perbenzoic acid are added while cooling with ice. On the following day the batch is discharged on to a 2 N sodium carbonate solution and extraction is carried out three times with toluene. The organic solutions are washed with 2 N sodium carbonate solution and water, dried, and then evaporated in vacuo. The residue is dissolved in 6 ml. of toluene and the solution is adsorbed on 2.3 grams of alumina (activity level II) while rinsing with 6 ml. of a 49:1 mixture of toluene and ethyl acetate. One hour later, elution is effected successively with 200 ml. each of 9:1 mixture of toluene and ethyl acetate and a 4:1 mixture of toluene and ethyl acetate, and pure ethyl acetate. The eluates are evaporated in vacuo, the residues are combined and then 0.6 ml. of methylene chloride and 2.4 ml. of absolute ether are added. 0.12 millilitre of boron trifluoride etherate is then added while stirring and, 20 minutes later, the reaction mixture is discharged on to a saturated sodium bicarbonate solution. After extracting three times with methylene chloride, the organic solutions are washed with water, dried, and evaporated in vacuo. The residue is chromatographed on 2 grams of silica gel and elution is effected with a 4:1 mixture of benzene and ethyl acetate. 3-oxo-7α, 17α-dimethyl-17β-hydroxy-$\Delta^{4:9:11}$-19-nor-androstatriene is obtained which, after crystallization from ether, melts at 167 to 173° C. (Yield: 7 mg.).

EXAMPLE 9

2.4 grams of lithiumacetylide-ethylenediamine are added to a solution of 2.5 grams of 3-methoxy-7α-methyl-17-oxo-$\Delta^{2:5(10)}$-19-nor-androstadiene in 35 ml. of dimethylsulphoxide and 6 ml. of toluene in a current of nitrogen and while stirring, rinsing being effected with 6 ml. of toluene. The batch is stirred for 20 hours at room temperature and then 10 grams of ammonium chloride are added followed by water. Extraction is carried out three times with methylene chloride, the organic solutions are washed with dilute sodium chloride solution, dried. and then evaporated in vacuo. The residue is chromatographed on 75 grams of alumina (Activity level II). The first fractions eluted with toluene are crystallized from a mixture of ether and pentane and 235 mg. of starting material are obtained. The subsequent fractions eluted with toluene and a 19:1 mixture of toluene and ethyl acetate yield 3-methoxy-7α-methyl - 17α-ethinyl-17β-hydroxy-$\Delta^{2:5(10)}$-19-nor-androstadiene. 1.66 grams of this compound are obtained after recrystallization from a mixture of ether and pentane. After being recrystallized several times it melts at 134.5 to 137.5° C. 1.3 grams of the ethinylcarbinol so obtained are dissolved in 110 ml. of methanol; a solution of 1.22 grams of oxalic acid in 22 ml. of water is then added. 40 minutes later the batch is poured on to 260 ml. of water and extraction is carried out three times wih toluene. The organic solutions are washed with sodium bicarbonate solution and water, dried, and evaporated in vacuo. The residue is crystallized from a mixture of methylene chloride displays characteristic bands at 2.74μ (hydroxyl), methyl - 17α-ethinyl-17β-hydroxy-$\Delta^{5(10)}$-19-nor-androstene melting at 168 to 169° C. are obtained. The infra-red spectrum of the compound dissolved in methylene chloride displays characteristic bands at 2.74μ (hydroxyl), 2.97μ (ethinyl) and 5.81μ (6-ring ketone).

EXAMPLE 10

490 milligrams of 3-oxo-7α-methyl-17α-ethinyl-17β-hydroxy-$\Delta^{4,9}$-19-nor-androstadiene melting at 188 to 191° C. are obtained from 1.9 grams of 3-oxo-7α-methyl-17α-ethinyl-17β-hydroxy-$\Delta^{5(10)}$-19-nor-androstene by bromination in pyridine in accordance with the process indicated in Example 7 and subsequent chromatography on silica gel. The melting point is raised to 190.5 to 193° C. by crystallization from a mixture of methylene chloride and ether.

EXAMPLE 11

195 milligrams of 3-oxo-7α-methyl-17α-ethinyl-17β-hydroxy-$\Delta^{4,9}$-19-nor-androstadiene are converted into 3-pyrrolidine-7α-methyl-17α-ethinyl-17β-hydroxy - $\Delta^{3,5(10)9(11)}$-19-nor-androstatriene in a manner analogous to that described in Example 8, and the crude enamine is treated successively with acetic acid, metachloro-perbenzoic acid, alumina and boron trifluoride etherate. Chromatography on 2.5 grams of silica gel and elution with a 4:1 mixture of benzene and ethyl acetate yields 3-oxo-7α-methyl-17α-ethinyl-17β-hydroxy-$\Delta^{4,9:(11)}$-19-nor-androstatriene.

EXAMPLE 12

3 - oxo-7α-methyl-17α-allyl-17β-hydroxy-$\Delta^{5(10)}$-19-nor-androstene melting at 100 to 102.5° C. is obtained by reacting 3 - methoxy - 7α-methyl-17-oxo-$\Delta^{2,5(10)}$-19-nor-androstadiene with allylmagnesium bromide in a manner analogous to that described in Example 6 and subsequently carrying out a treatment with oxalic acid.

EXAMPLE 13

A mixture of 20 g. of 3-methoxy-7α-methyl-17-oxo-$\Delta^{1,3,5(10):9(11)}$-19-nor-androstatetraene, 1.1 liter of benzene, 11 ml. of ethyleneglycol and 440 mg. of p-toluene-sulfonic acid are heated 4 hours at the boil in a recipient fitted with a water separator, 100 ml. of saturated sodium bicarbonate solution is added to the cooled reaction mixture and the aqueous phase is extracted with benzene. The organic solutions are washed with water, dried and evaporated in vacuo. The residue is constituted by 3-methoxy-7α-methyl-17-ethylenedioxy-$\Delta^{1,3,5(10):9(11)}$ - 19 - nor-androstatetraene. (The above mentioned starting material may be obtained in a manner known per se from the corresponding 3-hydroxy derivative by methylation with dimethyl sulfate and sodium hydroxide.)

2.5 g. of commercial 85%—grade m—chloroperbenzoic acid are added at 0° to a stirred solution of 3.4 g. of 3 - methoxy-7α-methyl-17-ethylenedioxy-$\Delta^{1,3,5(10):9(11)}$-19-nor-androstatetraene in 100 ml. of methylene chloride. After a reaction period of 6 hours the mixture is poured onto 200 ml. of 2 N sodium carbonate solution and the mixture is extracted several times with toluene. The organic solutions are then washed with 2 N sodium carbonate solution and water and evaporated in vacuo. Upon evaporation of the solvent there is obtained a residue consisting of 3-methoxy-7α-methyl-9,11-oxido-17-ethylenedioxy-$\Delta^{1,3,5(10)}$-19-nor-androstatriene. This product is reduced to 3 - methoxy - 7α-methyl-11-hydroxy-17-ethylenedioxy-$\Delta^{2,5(10)}$-19-nor-androstadiene according to the method described in Example 5. 5 ml. of phosphorus oxychloride are added at 0° to a stirred solution of 5 g. of 3-methoxy - 7α - methyl - 11 - hydroxy-17-ethylenedioxy-$\Delta^{2,5(10)}$-19-nor-androstadiene in 50 ml. of pyridine. After having allowed the reaction mixture to stand for several hours at room temperature it is poured onto ice and the mixture extracted with toluene. The organic layer is washed with water, diluted hydrochloric acid, diluted sodium carbonate solution and water. The residue which remains upon evaporation of the organic solvent, after having dried the solution, is dissolved in 50 ml. of methanol. 2 ml. of concentrated hydrochloric acid are then added and the solution is warmed up for 15 minutes to 70°. The solution is then diluted with water, and extracted with toluene. The toluene solution is washed with water, dried and evaporated in vacuo. The 3,17-dioxo-7α-methyl-$\Delta^{4,9}$-19-nor-androstadiene is thus obtained.

5 g. of the 3,17-dioxo-7α-methyl-$\Delta^{4,9}$-19-nor-androstadiene are converted in known manner via the 3-enamine, for instance one derived from pyrrolidine, into the 3,17-dioxo - 7α-methyl-$\Delta^{5(10):9(11)}$-19-nor-androstadiene. This product is treated with m-chloroperbenzoic acid as described in Example 4 and the crude mixture of epoxides is treated with aluminium oxide and then with boron trifluoride also as described in Example 4. The 3,17-dioxo-7α-methyl-$\Delta^{4,9,11}$-19-nor-androstatriene is thus obtained.

If desired, the 3,17-dioxo-7α-methyl-$\Delta^{4,9,11}$-19-nor-androstatriene is converted in known manner into the 17-cyanhydrin, the 3-oxo group is converted into the oximino group and the cyanhydrin group is then hydrolysed to yield the 3 - oximino-7α-methyl-17-oxo-$\Delta^{4,9,11}$-19-nor-androstatriene. This compound is treated with methyl magnesium bromide and then with pyruvic acid and the compound described in Example 8, viz. 3-oxo-7α-17α-dimethyl-17β-hydroxy-$\Delta^{4,9(11)}$-19-nor-androstatriene is obtained.

EXAMPLE 14

5 g. of the 3-oxo-7α-methyl-17β-benzoyloxy-$\Delta^{4,9,11}$-19-nor-androstatriene described in Example 5 are saponified with potassium carbonate in methanolic solution under nitrogen and with the addition of hydroquinone. 3-oxo-7α - methyl-17β-hydroxy-$\Delta^{4,9,11}$-19-nor-androstatriene is thus obtained. This compound is converted in known manner into its oxime and the latter is oxidized according to Oppenauer's method to the 3-oximino-7α-methyl-17-oxo-$\Delta^{4,9,11}$-19-nor-androstatriene described in Example 13. This compound is reacted with ethinyl magnesium bromide and the 3-oximino group in the conversion product is hydrolysed with pyruvic acid: there is thus obtained 3-oxo - 7α - methyl-17α-ethinyl-17β-hydroxy-$\Delta^{4,9,11}$-19-nor-androstatriene described in Example 11.

What is claimed is:

1. A process for the manufacture of 17-oxygenated $\Delta^{4,9,11}$-19-nor-androstatrienes, wherein a member selected from the group consisting of a monoepoxide of a 17-oxygenated-3-oxo-$\Delta^{5(10):9(11)}$-19-nor-androstadiene obtainable from this diene compound with one mol equivalent of an organic peracid, and a mixture of such monoepoxides is treated with a Lewis acid.

2. Process as claimed in claim 1, wherein boron trifluoride is used as the Lewis acid.

3. Process as claimed in claim 1, wherein boron trifluoride is used in the form of its ether complex.

4. Process as claimed in claim 1, wherein zinc chloride is used as the Lewis acid.

5. Process as claimed in claim 1, wherein aluminium chloride is used as the Lewis acid.

6. Process as claimed in claim 1, wherein a member selected from the group consisting of iron-(III)-chloride and iron-(III)-sulfate is used as the Lewis acid.

7. Process as claimed in claim 1, wherein the treatment with the Lewis acid is carried out in an ether as solvent.

8. Process as claimed in claim 7, wherein ethyl ether is used as solvent.

9. Process as claimed in claim 1, wherein the treatment with a Lewis acid is carried out in a halogenated aliphatic hydrocarbon.

10. Process as claimed in claim 1, wherein a crystalline mixture of the monoepoxides of the 17-oxygenated-3-oxo-$\Delta^{5(10):9(11)}$-19-nor-androstadiene isolated from the crude oxidation mixture obtained by the treatment of the said diene compound with one mol equivalent of an organic peracid, is used as starting material.

11. Process as claimed in claim 10, wherein the crystalline mixture of epoxides is chromatographed on a silica containing adsorbent before treatment with a Lewis acid.

12. Process as claimed in claim 11, wherein alumina is used as an adsorbent in the place of silica containing adsorbents.

13. Process as claimed in claim 1, wherein there is used as starting material a compound obtained by subjecting the crude oxidation product of the peracid treatment of a 17-oxygenated 3-oxo-$\Delta^{5(10):9(11)}$-19-nor-androstadiene to chromatography on an adsorbent selected from the group consisting of alumina and a silica containing compound.

14. A compound of the formula

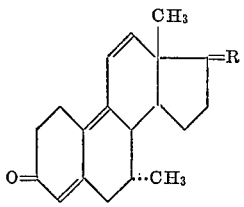

in which formula R is a member selected from the group consisting of an oxo group, a free hydroxy group, an esterified and an etherified hydroxy group together with a hydrogen atom and corresponding groups together with a lower aliphatic hydrocarbon radical.

15. A compound as claimed in claim 14, wherein the ester groups are derived from acids selected from the group consisting of an aliphatic, an alicyclic, an aromatic and a heterocyclic carboxylic acid having from 1 to 15 carbon atoms, and the ether groups are derived from alcohols selected from the group consisting of lower aliphatic, monocyclic lower araliphatic and heterocyclic alcohols.

16. A compound as claimed in claim 14, which compound is the $\Delta^{4,9,11}$-3-oxo-7α-methyl-17β-hydroxy-19-nor-androstatriene.

17. A compound as claimed in claim 14, which compound is a lower aliphatic carboxylic acid ester of the $\Delta^{4,9,11}$-3-oxo-7α-methyl-17β-hydroxy - 19 - nor-androstatriene.

18. A compound as claimed in claim 14, which compound is the $\Delta^{4,9,11}$-3-oxo-7α-methyl-17β-benzoyloxy-19-nor-androstatriene.

19. A compound as claimed in claim 14, which compound is the $\Delta^{4,9,11}$-3-oxo-7α,17α-dimethyl-17β-hydroxy-19-nor-androstatriene.

20. A compound as claimed in claim 14, which compound is the $\Delta^{4,9,11}$-3-oxo-7α-methyl-17α-ethinyl-17β-hydroxy-19-nor-androstatriene.

21. A compound as claimed in claim 14, which compound is the $\Delta^{4,9,11}$-3,17-dioxo-7αmethyl-19-nor-androstatriene.

References Cited

UNITED STATES PATENTS

| | | | |
|---|---|---|---|
| 3,478,067 | 11/1969 | Bertin et al. | 260—397.3 |
| 3,453,267 | 7/1969 | Vignau et al. | 260—239.55 |
| 3,118,919 | 1/1964 | Brown et al. | 260—397.45 |
| 3,248,294 | 4/1966 | Nomine et al. | 167—74 |
| 3,340,279 | 9/1967 | Jongh et al. | 260—397.4 |

OTHER REFERENCES

Campbell et al., Steroids, March 1963, vol. 1, pp. 317–324.

Joly et al., Comptes Rendus Acad. Sc. Paris, v. 258, June 1964, pp. 5669–5671.

Anner et al., Chimia, December 1966, pp. 434–435.

Velluz et al., Comptes Rendus Acad. Sc. Paris, v. 264, April 1967, pp. 1396–1401, Series C.

LEWIS GOTTS, Primary Examiner

E. C. LOVE, Assistant Examiner

U.S. Cl. X.R.

260—239.5, 239.55, 397.4, 397.45; 424—242, 243